United States Patent [19]

Prairie, Jr.

[11] Patent Number: 5,293,003
[45] Date of Patent: Mar. 8, 1994

[54] ELECTRICAL BOX EXTENDER

[76] Inventor: Marshall J. Prairie, Jr., 61 Lowden St., Pawtucket, R.I. 02860

[21] Appl. No.: 958,655

[22] Filed: Oct. 8, 1992

[51] Int. Cl.⁵ .............................................. H02G 3/08
[52] U.S. Cl. ........................................ 174/57; 220/3.7
[58] Field of Search ....................... 174/53, 57; 220/3, 7

[56] References Cited

U.S. PATENT DOCUMENTS 2,560,507  7/1951  Despard ............................... 174/53
3,418,420  4/1966  Zerwes ................................. 174/53

Primary Examiner—Leo P. Picard
Assistant Examiner—David A. Tone
Attorney, Agent, or Firm—Cesari & McKenna

[57] ABSTRACT

A box extender has movable gates for providing a first set of threaded holes for attaching a receptacle or other electrical device to the extender when the movable gates are in a "closed" position, and for swinging to an "open" position to facilitate access to a second set of holes for attaching the extender to an electrical box. The movable gates are in the form of flat plates that extend nearly all the way across the housing when they are in the closed position. The housing of the extender provides a device for defeatable retaining the movable gates in the closed position.

18 Claims, 3 Drawing Sheets

ELECTRICAL BOX EXTENDER

FIELD OF THE INVENTION

This invention relates generally to electrical wiring apparatus including electrical boxes and box extenders, also known as "extension rings."

BACKGROUND OF THE INVENTION

A conventional electrical box is used to mount and house an electrical device (e.g., an outlet receptacle or switch) and its electrical connections. Depending on the application, electrical boxes are called "outlet boxes" or "switch boxes," among other names.

Typically, each electrical box has a rigid housing with two, spaced-apart holes for receiving fastening screws for securing, e.g., the receptacle, to the housing. A cover plate typically fits over the housing, and has openings for providing access to the receptacle. The electrical box is typically installed within a building wall with only the cover, and, thus, the front of the receptacle being accessible. For use out-of-doors, the electrical box is usually adapted with an appropriate rubber gasket between the box and cover, so as to be weatherproof.

In many applications, particularly where electrical devices are being added or additional wiring connections are being made, an electrical box may not have sufficient interior space for the electrical device and the electrical connections. For these purposes, a box extender is used. A box extender effectively supplements the interior space of the electrical box, thereby providing a "larger" effective housing for accommodating the electrical device and/or the additional wiring.

During assembly, an electrician attaches the box extender to the electrical box, typically using screws that extend through a first set of holes provided by the extender, and threadedly engage the fastening holes in the box that are normally used for mounting an electrical device to the box. The electrician also fastens the electrical device to the extender, typically using screws that extend through receptacle holes and threadedly engage a second set of holes provided by the extender for that purpose.

Accordingly, the second set of holes in the extender must be in alignment with, and situated immediately over, the first set of holes in order to be able to effect assembly as just described. As a result, the portion of the extender in which the second set of holes is provided can obstruct access, e.g., by a screw driver, to the first set of holes. Consequently, it can be difficult, under field conditions, to insert and turn the screws used to attach the extender to the box.

This problem has been recognized heretofore, and various solutions proposed. For instance, a known, commercially available arrangement uses specially-adapted fastening screws to attach the electrical device to the extender, and the same fastening screws to attach the extender to the electrical box. The screws have "stepped" shafts, each with a threaded, large-diameter, upper portion and a threaded, small-diameter, lower portion. The electrician can mount the electrical device to the box extender using the upper portions of the screw shafts to engage large-diameter tapped holes in the extender, and can mount the box extender to the electrical box using the lower portions of the shafts to engage the standard holes in the electrical box.

A practical drawback with that approach stems from its dependence on the specially-adapted fastening screws. If those screws are lost or misplaced, which can happen all too readily during field assembly, the box extender can not be installed until replacement screws are supplied. Unfortunately, replacement screws of that type may not be readily available.

Another, very different approach is disclosed in U.S. Pat. No. 3,418,420. The extender of that patent has movable "gates" containing the extender's fastening holes for mounting the receptacle. The movable gates are attached to the extender's housing for pivotal movement. The gates are formed as short, thin-walled, "U"-shaped members. During installation, an electrician can swing the movable gates out of the way to an "open" position for access to the extender's conventionally-located, first set of holes for mounting the extender to the box. Then, the electrician can swing the mounting gates to a "closed" position at which the receptacle can be mounted to the box extender.

In the closed position, narrow portions of the extender's housing are received within central channels of the "U"-shaped movable gates. According to that patent, this arrangement assures that the movable gates are mechanically supported adequately to carry the weight of the receptacle, and to withstand the rigors associated with the assembly and installation process.

While the box extender of that patent is generally suited to its intended purposes, the configuration of the movable gates taught in that patent makes the manufacture of the disclosed extender expensive. Moreover, the movable gates of that patent are short in length, extending only a short distance across the front of the extender's housing and, thus, when open, provide significantly limited access to the box-mounting, first set of holes.

It would be desirable to provide an improved version of that extender, which is of a simpler design that can be manufactured economically, while maintaining or improving the functionality of that patent's movable gates.

SUMMARY OF THE INVENTION

The invention resides in a box extender having a pair of improved movable gates, each in the form of a substantially rigid, preferably solid, generally rectangular, flat plate of simple construction, having a mounting hole intermediate its ends (preferably, about midway).

The extender also has an improved housing with gate supporting features that not only provide adequate mechanical support to the movable gates, but also provide a gate retention arrangement for defeatably retaining the movable gates in the closed position. This later aspect of the invention assures proper positioning of the fastening holes in the movable gates when securing the electrical device to the extender, and thus facilitates field assembly of the "extended" electrical box. The above-described patent does not disclose means such as these for retaining the movable gates in the closed position.

More specifically, the box extender in accordance with the invention has a frame-like housing of generally rectangular cross-section. The housing has an open front and an open back. Near the back, the housing has fastening holes used for mounting it to an electrical box. Near the front, the housing has gate supporting members for supporting the movable gates at both of their ends. Each movable gate is mounted at one end, preferably by a screw, to one of the gate supporting members.

The movable gates can swing angularly from the closed position to the open position along a common plane. In the closed position, each movable gate is located adjacent to and parallel to an associated end wall of the extender's housing, and, in the open position, the movable gate's "free" (i.e., unattached) end is located away from the associated end wall.

As in the prior art patent, the movable gates are placed in the open position for improved access to the mounting holes near the back of the extender's housing. Unlike the prior art patent, however, the movable gates of the invention extend nearly all the way across the housing in the closed position. In that position, the free ends of the gates are supported by small gate supporting members or ridges formed integrally on the walls of the housing. Thus, the "closed" gates bridge a relatively large, unobstructed space, immediately over the box-mounting holes. Accordingly, the invention provides greater room for accessing the box-mounting holes when the gates are in the open position.

In accordance with another aspect of the invention, the gate retention arrangement uses gate retaining members located at the free ends of the gates, and uses the cantilevered nature of the gates, to capture and retain the gates in the closed position. As described above, the movable gates are attached at a first of their ends to the housing, and, in the open position, extend therefrom without support. When the movable gates are closed, their free ends are first pushed under the gate supporting members, and then over the gate retaining members. For this to occur, the movable gates can be flexed slightly, either along their lengths and/or at their attachment points, and the restoring forces caused by the flexure causes the gates to fit snugly between the supporting and retaining members at the free ends. This intimate frictional relationship causes the movable gates to be defeatable retained in the closed position.

In a variation of this embodiment providing even more positive gate retention, each gate retaining member has a top abutment element from which a detent (in the form of a small lip or dimple) projects downwardly into the interior of the housing to define an inner boundary for the closed position of an associated one of the movable gates. The detent blocks the gate from unintentionally moving out of the closed position. This detent arrangement can be defeated, and the gate moved to the open position, by slightly displacing, e.g., tilting, the movable gate downwardly into the interior of the housing, so that it can clear the detent and assume the open position. To move the movable gate into the closed position, it can usually be pressed passed the detent with a "snap" action and positioned between the opposing gate supporting and gate retaining members.

To aid in this procedure, the housing provides a "window," i.e., a small opening, near the free end of each closed gate, between the gate supporting and gate retaining members, for permitting a small tool, e.g., a screw driver, to be used to tilt the movable gate at its free end. In either embodiment, the operation of the movable gates can be facilitated by slightly loosening the mounting screws holding the movable gates to the extender's housing.

The box extender provided by the invention can be economically manufactured, is of rugged construction, does not require specially-adapted fastening screws, and can provide a reliable, weatherproof enclosure for a variety of electrical applications.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
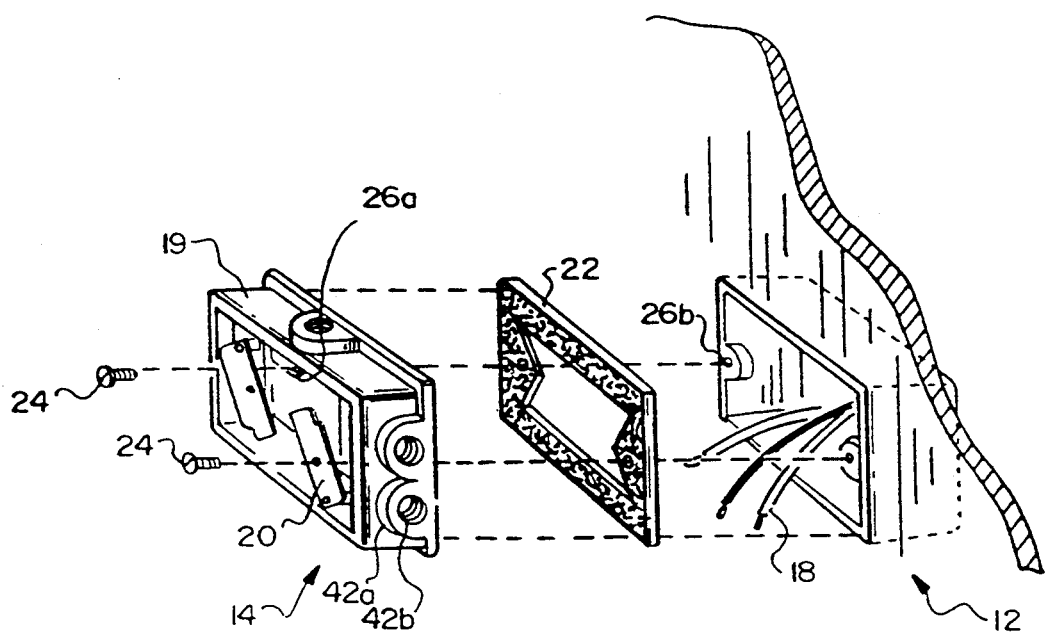
FIGS. 1 and 2 are exploded, perspective views of an "extended" electrical box including a box extender in accordance with a preferred embodiment of the invention, shown at two different stages of assembly in a typical application therefore.
Figure 2:
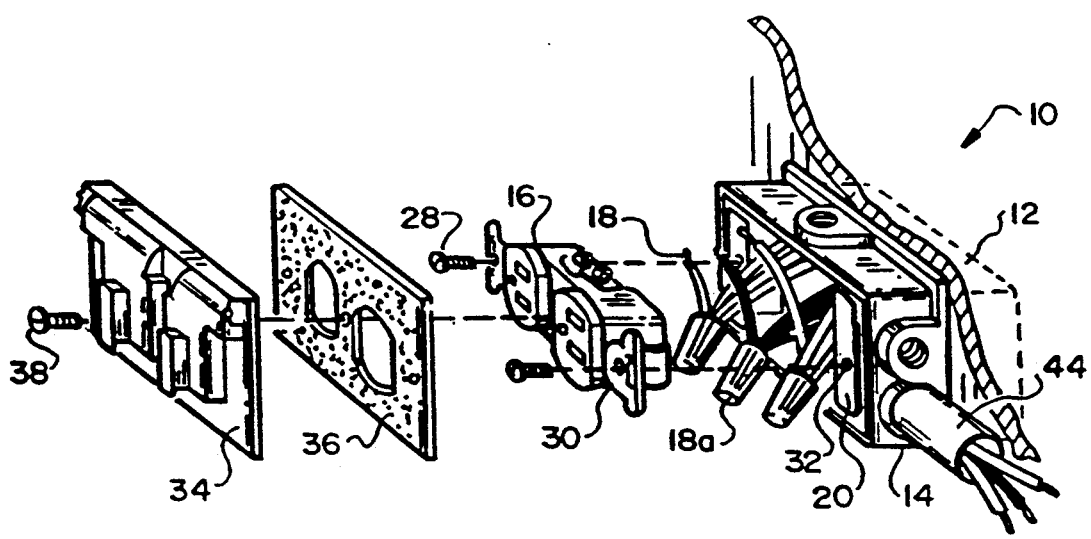

FIGS. 1 and 2 show an "extended" electrical box arrangement 10, including an electrical box 12 and a box extender or extension ring 14 in accordance with the invention. The extended electrical box arrangement 10 is used, e.g., for mounting a conventional electrical receptacle 16 or similar electrical device, and enclosing or housing the associated wiring 18.

Figure 4:
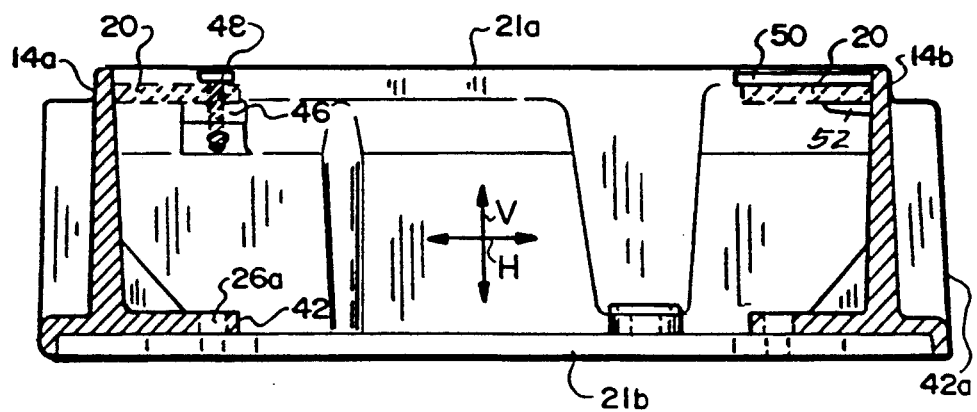
FIG. 4 is a sectional view taken along line 4—4 of FIG. 3, with the movable gates shown (in dashed lines) in a closed position.

The box extender 14 has a frame-like housing 19 of, e.g., rectangular cross-section, with an open front 21a and open back 21b (FIG. 4). The housing 19 has spaced, parallel side walls 14a, 14b that are endwise connected perpendicularly to spaced, parallel top and bottom walls 14c, 14d. Preferably, the housing 19 is of a unitary die-cast metal construction.

The box extender 14 also has a pair of movable gates 20 that can swing or pivot between a first or "open" position and a second or "closed" position. In the closed position, the movable gates 20 are adjacent (and parallel to) associated side walls 14a, 14b (see FIG. 3) of the housing 19. In the open position, the movable gates 20 are angularly displaced so as to have their free ends 20a located away from the side walls.

In accordance with the invention, each movable gate 20 is formed as a substantially rigid, preferably solid, rectangular, flat plate of relatively uniform thickness, preferably without any folds or bends. This construction renders the movable gates 20 inexpensive to manufacture.

As shown in FIG. 1, during assembly, the box extender 14 is mounted, typically, over a conventional weather-proofing gasket 22 to the electrical box 12 via conventional fastening screws 24 that extend through box-mounting holes 26a in the housing 19 and threadedly engage holes 26b in the electrical box 12. The box-mounting holes 26a are provided in lug members 27 located adjacent the back 21b of the housing 19, as can be seen best in FIGS. 3 and 4.

The movable gates 20 are placed in the open position to facilitate access to the box-mounting holes 26a during assembly of the extended electrical box 10. Later during assembly, as shown in FIG. 2, any required interconnection 18a of the wiring 18 can be effected, and then the electrical receptacle 16 can be mounted to the box extender 14, again using conventional fastening screws 28. The fastening screws 28 extend through mounting holes 30 in the electrical receptacle 16 and threadedly engage mounting holes 32 in the movable gates 20. For so mounting the electrical receptacle 16, the mounting gates 20 must be in their closed position.

To complete assembly, a cover plate 34 is mounted to the electrical receptacle 16 over a conventional, weather-proofing gasket 36 using, e.g., a conventional fastening screw 38.

Figure 3:
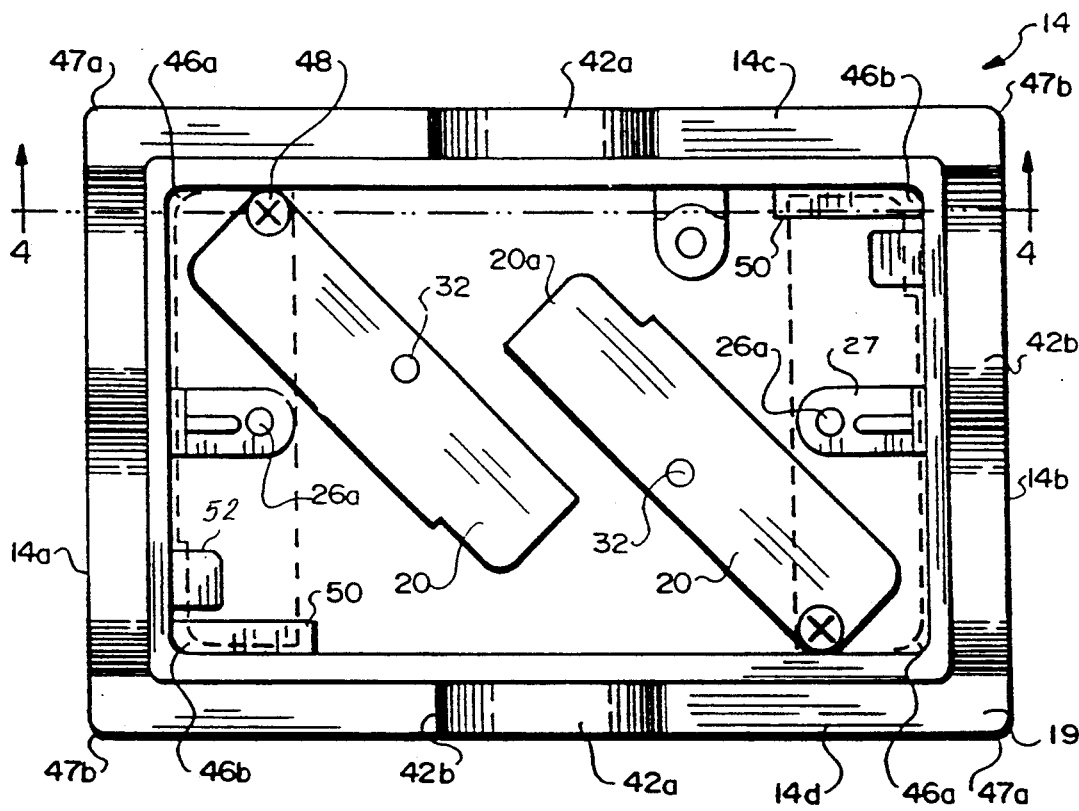
FIG. 3 is a top plan view of the box extender of FIG. 1, showing the movable gates (in solid lines) in an open position, and (in dashed lines) in a closed position.

FIG. 3 is a front view of the box extender 14 showing details of the housing 19, and showing the mounting gates 20 (in solid lines) in the open position, and (in dashed lines) in the closed position.

The housing 19 has a number of take-off hubs 42a with tapped bores 42b for receiving and threadedly engaging conventional wiring conduits 44 (FIG. 2). The housing 19 also has gate supporting members 46 located in diagonally opposite corners 47a of the housing 19, and gate supporting members 52 in the other corners 47b. A single, conventional screw 48 secures each movable gate 20 to the gate supporting members 46 at locations along the top and bottom walls 14c, 14d that are spaced from the side walls 14a, 14b by about the width in the horizontal direction of the movable gates 20. (The "horizontal" or "transverse" direction is the direction from one side wall 14a, 14b to the other side wall 14b, 14a, and is indicated by the arrows "H" in FIG. 4.)

The housing 19 also has gate retaining members 50 disposed near the corners 47b of the housing 19, along an associated one of the top and bottom walls 14c, 14d, in spaced relation to the gate supporting members 52, and near the front 21a (FIG. 1) of the housing 19. As can be seen in FIGS. 3 and 4, when the movable gates 20 are in the closed position, their free ends 20a lie proximate the corners 47b, under the gate retaining members 50 and over the gate supporting members 52. Thus, the gate supporting and retaining members 52, 50 serve to capture the otherwise free ends 20a of the movable gates when in the closed position, thereby preventing movement thereof in the vertical direction (indicated by the arrows "V" in FIG. 4).

The gate retaining members 50 also serve to capture the movable gates 20 in the horizontal direction "H", using the cantilevered nature of the movable gates 20 in this regard. As described above, the movable gates 20 are attached (by screws 48) at a first of their ends to the housing 19, and, in the open position, extend therefrom without support. When the movable gates 20 are closed, their free ends 20a are first pushed under the gate supporting members 50, and then over the gate retaining members 52. For this to occur, the movable gates 20 can be flexed slightly, either along their longitudinal length (i.e., between the attachment points (i.e., screws 48) and the free ends 20a) or, alternatively, at the attachment points only, and the restoring forces caused by the flexure causes the gates to fit snugly between the supporting and retaining members 52, 50 at the free ends. This intimate frictional relationship causes the movable gates 20 to be defeatable retained in the closed position.

Other arrangements for capturing the free ends of the movable gates can be used, so long as the retaining and supporting members 52, 50 are appropriately configured, arranged and dimensioned. For example, the members 50, 52 and the attachment points (i.e., screws 48) can be designed to require the movable gates 20 to be tilted while screws 48 are in a loosened state so as to assume the gates' closed position, and then the screws 48 can be tightened to maintain that position.

Figure 6:
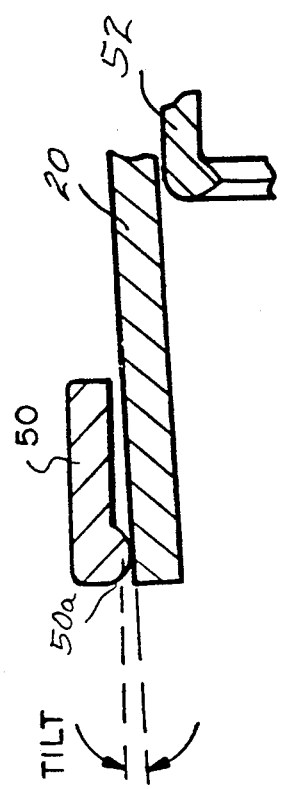
FIG. 6 is a detail view showing the movable gate of FIG. 5 being tilted to permit it to be moved from the closed position.
Figure 5:
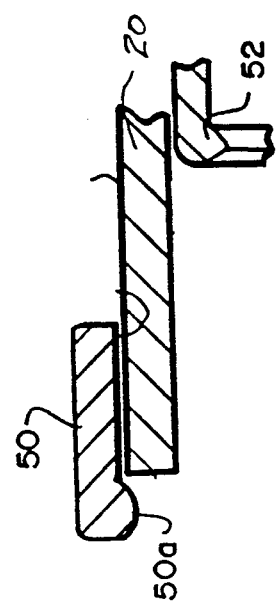
FIG. 5 is a detail view showing one of the retaining members having a detent for positively retaining the associated movable gate in the closed position in accordance with an alternative embodiment of the invention.

In a variation of this embodiment shown in FIGS. 5 and 6, which provides even more positive gate retention, each gate retaining member 50 has a top abutment element from which a detent 50a (in the form of a small lip or dimple) projects downwardly into the interior of the housing 19 to define an inner boundary for the closed position of an associated one of the movable gates 20. The detent 50a blocks the associated gate 20 from unintentionally moving out of the closed position. This detent arrangement can be defeated, and the associated gate 20 moved to the open position, by slightly displacing, e.g., tilting, the movable gate downwardly into the interior of the housing 19, so that it can clear the detent 50a and assume the open position. To move the movable gate 20 into the closed position, it can usually be pressed passed the detent 50a with a "snap" action and be positioned between the opposing gate supporting and gate retaining members 52, 50.

To aid in this procedure, the housing 19 provides a "window" 46b (FIG. 3) i.e., a small opening, near the free end 20a of each closed gate, between the gate supporting and gate retaining members 52, 50, for permitting a small tool, e.g., a screw driver (not shown), to be used to tilt the movable gate 20 at its free end 20a. In either embodiment, the operation of the movable gates 20 can be facilitated by slightly loosening the mounting screws 48 holding the movable gates 20 to the extender's housing 19.

The foregoing description has been limited to a specific embodiment of this invention. It will be apparent, however, that variations and modifications may be made to the embodiment, with the attainment of some or all of the advantages of the invention. Therefore, it is the object of the appended claims to cover all such variations and modifications as come within the true spirit and scope of the invention.

What is claimed is:

1. An electrical box extender comprising:
  A) a housing including first and second pairs of opposing side walls, an open front, an open back, and a first set of mounting holes disposed near the back;
  B) first and second movable gates, each in the form of an elongated plate having a first end and a second, free end, said movable gates having a second set of mounting holes for mounting an electrical device, each said gate having one of said holes of said second set disposed intermediate said first and second ends; said movable gates being secured to said housing at said first ends for pivotal movement between a closed position at which both said first and second ends of said movable gates are disposed adjacent said first pair of housing side walls, and an open position at which said second, free ends of said movable gates are disposed in spaced relation to said housing side walls; and
  C) said housing including (i) first and second gate support members integral with said walls of said housing for supporting said free ends of said gates when said gates are in said closed position, and (ii) means for retaining said movable gates in said closed position comprising said gate support members and first and second gate retaining members, each said gate retaining member being located in spaced relation to and nearer the open front than a corresponding one of said gate support members such that each said gate retaining member and said corresponding gate support member cooperate to capture therebetween said free end of an associated one of said movable gates when said associated movable gate is disposed in said closed position, said support and retaining members and said movable gates being configured such that movement of said movable gates from said open position into said closed position requires flexure of said movable gates, and such that restoring forces due to said flexure retain said movable gates in said closed position.

2. The box extender in accordance with claim 1, wherein each said gate retaining member includes a detent extending in a direction from said open front towards said back of said housing for preventing said gate from unintentionally moving from said closed position.

3. The box extender in accordance with claim 1, wherein each movable gate extends substantially across the housing when in the closed position.

4. The box extender in accordance with claim 1, further comprising means for attaching said movable gates to said housing, said attachment means capable of providing said flexure of said movable gates so to permit said movable gates to move between said open and closed positions.

5. The box extender in accordance with claim 1, wherein each said movable gate can be flexed between said first and second ends thereof so to permit said movable gates to move between said open and closed positions.

6. The box extender in accordance with claim 1, wherein each said movable gate comprises a solid plate.

7. The box extender in accordance with claim 1, wherein said support members extend from said first pair of housing side walls a distance that is substantially less than that by which said retaining members extend from said first pair of housing side walls.

8. A box extender comprising:
A) frame-like housing having walls defining a generally rectangular shape with an open front and open back, and having, near the back, a plurality of fastening holes used for mounting the housing to an electrical box, and, near the front, a plurality of gate support members, and a plurality of gate retaining members; and
B) a plurality of movable gates, each in the form of an elongated plate having a first end, a second, free end, and a mounting hole intermediate said first and second ends; said movable gates being secured to said housing at said first ends for pivotal movement along a common plane between a closed position at which said movable gates are disposed adjacent said housing side walls, and an open position at which said free ends of said movable gates are disposed in spaced relation to said housing side walls; said movable gates being supported at both said ends by said gate support members and being not supported intermediate said ends, and extending nearly substantially across the housing;
C) wherein, in the closed position, the free ends of the movable gates are disposed in transverse spaces, each transverse space being bounded underneath by one of the gate support members, above by a corresponding one of the gate retaining members, and on one side by one of the side walls of the housing; and
D) wherein each said gate retaining member and said corresponding gate support member cooperate to capture therebetween said free end of an associated one of said movable gates to prevent said associated movable gate from accidentally moving from said closed position, said support and retaining members and said movable gates being configured such that movement of said movable gates from said open position into said closed position requires flexure of said movable gates, and such that restoring forces due to said flexure retain said movable gates in said closed position.

9. The box extender in accordance with claim 8, wherein said housing further includes a plurality of detents each comprising a small, projection that is sized, configured and disposed for blocking the associated movable gate from unintentionally moving out of the transverse space and, thus, out of the closed position.

10. The box extender in accordance with claim 8, further comprising means for attaching said movable gates to said housing, said attachment means capable of providing said flexure of said movable gates so to permit said movable gates to move between said open and closed positions.

11. The box extender in accordance with claim 8, wherein each said movable gate can be flexed between said first and second ends thereof so to permit said movable gates to move between said open and closed positions.

12. The box extender in accordance with claim 8, wherein each said movable gate comprises a solid plate.

13. The box extender in accordance with claim 8, wherein said walls define a plurality of corners, each of said corners defining a space; said support members being located only in said corners spaces, and said retaining means being located only in said spaces defined by a first and second of said corners.

14. The box extender in accordance with claim 8, wherein said walls define a plurality of corners, each of said corners defining a space; said support members being located only in said corners spaces, and said retaining means being located only in said spaces defined by a first and second of said corners.

15. The box extender in accordance with claim 8, wherein said support members extend from said first pair of housing side walls a distance that is substantially less than that by which said retaining members extend from said first pair of housing side walls.

16. A method of attaching a box extender to an electrical box and an electrical device to said box extender, said box extender comprising a housing having walls defining a generally rectangular shape with an open front and open back, and having, near the back, a plurality of fastening holes used for mounting the housing to said electrical box, and, near the front, a plurality of gate support and retaining members secured to the walls thereof; and first and second movable gates, each in the form of an elongated plate having a first end, a second, free end, and a mounting hole intermediate said first and second ends; said movable gates being secured to said housing at attachment points proximate said first ends for pivotal movement along a common plane between a closed position at which said movable gates are disposed adjacent said housing side walls for mounting said electrical device to said mounting holes, and an open position at which said free ends of said movable gates are disposed in spaced relation to said housing side walls for providing access to said fastening holes; said method comprising:

A) attaching said box extender to said electrical box using said fastening holes while said movable gates are in said open position;

B) moving said movable gates to said closed position, including the steps of flexing said movable gates so that said free ends thereof move over said gate support members and then under a gate retaining member, and, after said flexing step, ceasing the flexing of said movable gates such that restoring forces resulting therefrom cause said movable gates to be retained between said retaining and support members, said support members being disposed adjacent said first and second ends and not intermediate said ends; and C) after said moving step, attaching said electrical device to said box extender using said mounting holes in said movable gates.

17. The method in accordance with claim 16, wherein said flexing step includes the steps of loosening first and second attachment screws that attach said movable gates to said housing and flexing said movable gates from said common plane at said attachment points, and said flex ceasing step includes the steps of tightening said attachment screws.

18. The method in accordance with claim 16, wherein said flexing step includes the step of flexing said movable gates intermediate said first and second ends.

* * * * *